(12) United States Patent
Pariseau et al.

(10) Patent No.: US 11,913,869 B2
(45) Date of Patent: *Feb. 27, 2024

(54) PERSONAL AIR QUALITY MONITORING SYSTEM

(71) Applicant: Particles Plus, Inc., Stoughton, MA (US)

(72) Inventors: David Pariseau, Los Altos, CA (US); Adam Giandomenico, Walpole, MA (US)

(73) Assignee: Particles Plus, Inc., Stoughton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/102,208

(22) Filed: Jan. 27, 2023

(65) Prior Publication Data

US 2023/0400403 A1  Dec. 14, 2023

Related U.S. Application Data

(63) Continuation of application No. 17/512,406, filed on Oct. 27, 2021, now Pat. No. 11,579,072, which is a continuation of application No. 16/537,492, filed on Aug. 9, 2019, now Pat. No. 11,169,077, which is a continuation of application No. 16/443,508, filed on Jun. 17, 2019, now Pat. No. 11,519,842, which is a continuation of application No. 14/214,876, filed on Mar. 15, 2014, now Pat. No. 10,352,844.

(60) Provisional application No. 61/786,658, filed on Mar. 15, 2013, provisional application No. 61/786,616, filed on Mar. 15, 2013, provisional application No. 61/786,667, filed on Mar. 15, 2013, provisional application No. 61/786,642, filed on Mar. 15, 2013, (Continued)

(51) Int. Cl.
G01N 15/14 (2006.01)
G01N 15/00 (2006.01)

(52) U.S. Cl.
CPC . *G01N 15/1459* (2013.01); *G01N 2015/0046* (2013.01); *G01N 2015/1486* (2013.01); *G01N 2015/1493* (2013.01)

(58) Field of Classification Search
CPC ....... G01N 15/1459; G01N 2015/0046; G01N 2015/1486; G01N 2015/1493
USPC ...................................................... 356/343
See application file for complete search history.

(56) References Cited

U.S. PATENT DOCUMENTS 3,361,030 A  1/1968  Goldberg
3,696,399 A  10/1972  Klein et al.
(Continued)

FOREIGN PATENT DOCUMENTS

CN  100478670 C  4/2009
CN  202720173 U  2/2013
(Continued)

OTHER PUBLICATIONS

Alphasense Ltd., Alphasense User Manual OPC-N2 Optical Particle Counter. www.alphasense.com. 072-0300, Issue 3, 15 pages, Apr. 2015.

(Continued)

*Primary Examiner* — Md M Rahman
(74) *Attorney, Agent, or Firm* — McCarter & English, LLP

(57) ABSTRACT

An airborne, gas, or liquid particle sensor with multiple particle sensor blocks in a single particle counter. Each sensor would sample a portion of the incoming airstream, or possibly a separate airstream. The various counters could be used separately or in concert.

20 Claims, 9 Drawing Sheets

Related U.S. Application Data provisional application No. 61/786,651, filed on Mar. 15, 2013.

(56) References Cited

U.S. PATENT DOCUMENTS

| | | |
|---|---|---|
| 3,710,933 A | 1/1973 | Fulwyler et al. |
| 3,919,050 A | 11/1975 | Curby |
| 3,941,982 A | 3/1976 | Knollenberg et al. |
| 4,011,459 A | 3/1977 | Knollenberg et al. |
| 4,153,541 A | 5/1979 | Rumpf et al. |
| 4,232,967 A | 11/1980 | Grachev et al. |
| 4,276,472 A | 6/1981 | Costantino et al. |
| 4,361,403 A | 11/1982 | Loos |
| 4,383,917 A | 5/1983 | Wells |
| 4,506,678 A | 3/1985 | Russell et al. |
| 4,571,079 A | 2/1986 | Knollenberg |
| 4,594,715 A | 6/1986 | Knollenberg |
| 4,607,228 A | 8/1986 | Reif |
| 4,636,075 A | 1/1987 | Knollenberg |
| 4,728,190 A | 3/1988 | Knollenberg |
| 4,740,988 A | 4/1988 | Knollenberg et al. |
| 4,798,465 A | 1/1989 | Knollenberg |
| 4,832,011 A | 5/1989 | Busch |
| 4,872,972 A | 10/1989 | Wakabayashi et al. |
| 4,893,928 A | 1/1990 | Knollenberg |
| 4,893,932 A | 1/1990 | Knollenberg |
| 4,928,153 A | 5/1990 | Glass |
| 4,984,889 A | 1/1991 | Sommer |
| 4,999,498 A | 3/1991 | Hunt et al. |
| 5,000,052 A | 3/1991 | Sipin |
| 5,001,463 A | 3/1991 | Hamburger |
| 5,059,395 A | 10/1991 | Brittenham et al. |
| 5,093,571 A | 3/1992 | Inomata et al. |
| 5,096,474 A | 3/1992 | Miller, Jr. et al. |
| 5,235,625 A | 8/1993 | Stolz et al. |
| 5,257,087 A | 10/1993 | Furuya |
| 5,269,659 A | 12/1993 | Hampton et al. |
| 5,282,151 A | 1/1994 | Knollenberg |
| 5,317,930 A | 6/1994 | Wedding |
| 5,410,403 A | 4/1995 | Wells |
| 5,426,501 A | 6/1995 | Hokanson et al. |
| 5,428,964 A | 7/1995 | Lobdell |
| 5,467,189 A | 11/1995 | Kreikbaum et al. |
| 5,493,123 A | 2/1996 | Knollenberg et al. |
| 5,498,273 A | 3/1996 | Mann |
| 5,515,164 A | 5/1996 | Kreikbaum et al. |
| 5,553,507 A | 9/1996 | Basch et al. |
| 5,553,795 A | 9/1996 | Tsai et al. |
| 5,600,438 A | 2/1997 | Kreikbaum et al. |
| 5,671,046 A | 9/1997 | Knowlton |
| 5,751,422 A | 5/1998 | Mitchell |
| 5,805,281 A | 9/1998 | Knowlton |
| 5,825,487 A | 10/1998 | Felbinger et al. |
| 5,861,950 A | 1/1999 | Knowlton |
| 5,903,338 A | 5/1999 | Mavliev et al. |
| 5,961,291 A | 10/1999 | Sakagami et al. |
| 6,016,194 A | 1/2000 | Girvin et al. |
| 6,031,610 A | 2/2000 | Adams |
| 6,035,551 A | 3/2000 | Scheufler et al. |
| 6,061,132 A | 5/2000 | Girvin et al. |
| 6,091,502 A | 7/2000 | Weigl et al. |
| 6,137,572 A | 10/2000 | DeFreez et al. |
| 6,167,107 A | 12/2000 | Bates |
| 6,246,474 B1 | 6/2001 | Cerni et al. |
| 6,275,290 B1 | 8/2001 | Cerni et al. |
| 6,284,025 B1 | 9/2001 | Kreisberg et al. |
| 6,327,918 B1 | 12/2001 | Lawless |
| 6,386,015 B1 | 5/2002 | Rader et al. |
| 6,398,118 B1 | 6/2002 | Rosen et al. |
| 6,508,631 B1 | 1/2003 | Smith et al. |
| 6,592,822 B1 | 7/2003 | Chandler |
| 6,615,679 B1 | 9/2003 | Knollenberg et al. |
| 6,705,844 B2 | 3/2004 | Englander |
| 6,709,311 B2 | 3/2004 | Cerni |
| 6,788,152 B2 | 9/2004 | Nishizono |
| 6,859,277 B2 | 2/2005 | Wagner et al. |
| 6,900,439 B2 | 5/2005 | Komiyama et al. |
| 6,903,818 B2 | 6/2005 | Cerni et al. |
| 6,945,090 B2 | 9/2005 | Rodier |
| 6,988,671 B2 | 1/2006 | DeLuca |
| 7,011,491 B2 | 3/2006 | Englander |
| 7,030,980 B1 | 4/2006 | Sehler et al. |
| 7,058,477 B1 | 6/2006 | Rosen |
| 7,088,446 B2 | 8/2006 | Cerni |
| 7,088,447 B1 | 8/2006 | Bates et al. |
| 7,150,408 B2 | 12/2006 | DeLuca |
| 7,208,123 B2 | 4/2007 | Knollenberg et al. |
| 7,235,214 B2 | 6/2007 | Rodier et al. |
| RE39,783 E | 8/2007 | Cerni et al. |
| 7,343,751 B2 | 3/2008 | Kates |
| 7,439,855 B1 | 10/2008 | Yufa |
| 7,456,960 B2 | 11/2008 | Cerni et al. |
| 7,457,709 B2 | 11/2008 | Zhang et al. |
| 7,473,216 B2 | 1/2009 | Lolachi et al. |
| 7,521,682 B1 | 4/2009 | Holland et al. |
| 7,576,857 B2 | 8/2009 | Wagner |
| 7,598,878 B2 | 10/2009 | Goldreich |
| 7,604,676 B2 | 10/2009 | Braziunas |
| 7,616,126 B2 | 11/2009 | Kadwell et al. |
| 7,667,839 B2 | 2/2010 | Bates |
| 7,724,150 B2 | 5/2010 | Chandler et al. |
| 7,796,255 B2 | 9/2010 | Miller |
| 7,799,567 B1 | 9/2010 | Call |
| 7,831,801 B1 | 11/2010 | Anderson |
| 7,867,779 B2 | 1/2011 | McDermott et al. |
| 7,895,000 B2 | 2/2011 | Chandler et al. |
| 7,916,293 B2 | 3/2011 | Mitchell et al. |
| 7,932,490 B2 | 4/2011 | Wang et al. |
| 7,973,929 B2 | 7/2011 | Bates |
| 7,985,949 B2 | 7/2011 | Rodier |
| 8,009,290 B2 | 8/2011 | Unger |
| 8,027,035 B2 | 9/2011 | Mitchell et al. |
| 8,047,055 B2 | 11/2011 | Wang et al. |
| 8,146,376 B1 | 4/2012 | Williams et al. |
| 8,154,724 B2 | 4/2012 | Mitchell et al. |
| 8,174,697 B2 | 5/2012 | Mitchell et al. |
| 8,219,249 B2 | 7/2012 | Harrod et al. |
| 8,415,635 B2 | 4/2013 | Marks et al. |
| 8,424,397 B2 | 4/2013 | Fjerdingstad |
| 8,427,642 B2 | 4/2013 | Mitchell et al. |
| 8,534,116 B2 | 9/2013 | Wang et al. |
| 8,708,708 B1 | 4/2014 | Carideo et al. |
| 8,800,383 B2 | 8/2014 | Bates |
| 9,070,272 B2 | 6/2015 | Gettings et al. |
| 9,116,121 B2 | 8/2015 | Kaye et al. |
| 9,140,638 B2 | 9/2015 | Pariseau et al. |
| 9,140,639 B2 | 9/2015 | Pariseau |
| 9,141,094 B2 | 9/2015 | Pariseau et al. |
| 9,157,847 B2 | 10/2015 | Pariseau et al. |
| 9,158,652 B2 | 10/2015 | Pariseau |
| 9,170,180 B2 | 10/2015 | Shinohara et al. |
| 9,261,287 B2 | 2/2016 | Warren et al. |
| 9,335,244 B2 | 5/2016 | Han |
| 9,470,627 B2 | 10/2016 | Alexander et al. |
| 9,541,475 B2 | 1/2017 | Chu et al. |
| 9,677,990 B2 | 6/2017 | Pariseau et al. |
| 9,726,579 B2 | 8/2017 | Han et al. |
| 10,041,862 B2 | 8/2018 | Han et al. |
| 10,054,534 B1 | 8/2018 | Nourbakhsh et al. |
| 10,229,563 B2 | 3/2019 | Salton et al. |
| 10,352,844 B2 | 7/2019 | Pariseau |
| 10,718,703 B2 | 7/2020 | Pariseau et al. |
| 10,983,040 B2 | 4/2021 | Pariseau |
| 11,169,077 B2 | 11/2021 | Pariseau et al. |
| 11,519,842 B2 | 12/2022 | Pariseau |
| 11,579,072 B2 | 2/2023 | Pariseau et al. |
| 2002/0083780 A1 | 7/2002 | Lutz et al. |
| 2002/0135764 A1 | 9/2002 | Oka et al. |
| 2003/0009334 A1 | 1/2003 | Printz et al. |
| 2003/0051023 A1 | 3/2003 | Reichel et al. |
| 2003/0078751 A1 | 4/2003 | Juhasz |
| 2003/0105546 A1 | 6/2003 | Robinson et al. |
| 2004/0068359 A1 | 4/2004 | Neiss et al. |
| 2004/0068389 A1 | 4/2004 | Kleefstra |

(56) References Cited

U.S. PATENT DOCUMENTS

| | | |
|---|---|---|
| 2004/0222307 A1 | 11/2004 | DeLuca |
| 2004/0260702 A1 | 12/2004 | Cragun et al. |
| 2005/0028593 A1 | 2/2005 | Rodier |
| 2005/0043926 A1 | 2/2005 | Hayzen et al. |
| 2005/0100181 A1 | 5/2005 | Croft et al. |
| 2005/0161517 A1 | 7/2005 | Helt et al. |
| 2005/0270151 A1 | 12/2005 | Winick |
| 2006/0049815 A1 | 3/2006 | Ho et al. |
| 2006/0071803 A1 | 4/2006 | Hamburger et al. |
| 2006/0234621 A1 | 10/2006 | Desrochers et al. |
| 2007/0092976 A1 | 4/2007 | Watson et al. |
| 2007/0147702 A1 | 6/2007 | Scoullar et al. |
| 2007/0159156 A1 | 7/2007 | Hu et al. |
| 2007/0178529 A1 | 8/2007 | Breidford et al. |
| 2007/0229825 A1 | 10/2007 | Bates |
| 2008/0057931 A1 | 3/2008 | Nass et al. |
| 2008/0182506 A1 | 7/2008 | Jackson et al. |
| 2008/0215345 A1 | 9/2008 | Hollingsworth et al. |
| 2008/0221812 A1 | 9/2008 | Pittaro et al. |
| 2008/0246963 A1 | 10/2008 | Nakajima |
| 2009/0050538 A1 | 2/2009 | Lean et al. |
| 2009/0128810 A1 | 5/2009 | Bates |
| 2009/0190128 A1 | 7/2009 | Cerni et al. |
| 2009/0237659 A1 | 9/2009 | Miers |
| 2009/0242799 A1 | 10/2009 | Bolotin et al. |
| 2009/0259709 A1 | 10/2009 | Nikitin |
| 2009/0268202 A1 | 10/2009 | Wagner |
| 2009/0283456 A1 | 11/2009 | Le Vot et al. |
| 2010/0212670 A1 | 8/2010 | Amighi et al. |
| 2010/0225913 A1 | 9/2010 | Trainer |
| 2010/0253509 A1 | 10/2010 | Fu et al. |
| 2010/0264301 A1 | 10/2010 | Borosak |
| 2010/0282260 A1 | 11/2010 | Sung |
| 2011/0175661 A1 | 7/2011 | Quesada et al. |
| 2011/0277679 A1 | 11/2011 | Good et al. |
| 2011/0303859 A1 | 12/2011 | Lofstrom et al. |
| 2012/0012744 A1 | 1/2012 | Wang et al. |
| 2012/0085831 A1 | 4/2012 | Kopp |
| 2012/0140231 A1 | 6/2012 | Knox et al. |
| 2012/0295301 A1 | 11/2012 | Miyashita et al. |
| 2013/0040857 A1 | 2/2013 | Anderson |
| 2013/0166251 A1 | 6/2013 | Latimer et al. |
| 2013/0270287 A1 | 10/2013 | Guo et al. |
| 2013/0286392 A1 | 10/2013 | Erdtmann |
| 2013/0295588 A1 | 11/2013 | Watkins et al. |
| 2014/0022547 A1 | 1/2014 | Knox et al. |
| 2014/0053586 A1 | 2/2014 | Poecher et al. |
| 2014/0134608 A1 | 5/2014 | Hanashi et al. |
| 2014/0281659 A1 | 9/2014 | Pariseau |
| 2014/0354976 A1 | 12/2014 | Evenstad et al. |
| 2015/0063982 A1 | 3/2015 | Pariseau et al. |
| 2015/0200083 A1 | 7/2015 | Brown et al. |
| 2015/0316463 A1 | 11/2015 | Pariseau et al. |
| 2015/0323941 A1 | 11/2015 | Pariseau et al. |
| 2016/0000358 A1 | 1/2016 | Lundin et al. |
| 2016/0067531 A1 | 3/2016 | Pariseau et al. |
| 2017/0241893 A1 | 8/2017 | Walls et al. |
| 2017/0336312 A1 | 11/2017 | Stoeber et al. |
| 2020/0371015 A1 | 11/2020 | Pariseau et al. |
| 2020/0378940 A1 | 12/2020 | Pariseau |
| 2021/0025805 A1 | 1/2021 | Pariseau et al. |
| 2021/0025806 A1 | 1/2021 | Pariseau et al. |
| 2021/0025807 A1 | 1/2021 | Pariseau et al. |
| 2021/0063299 A1 | 3/2021 | Pariseau et al. |
| 2021/0088437 A1 | 3/2021 | Pariseau et al. |
| 2022/0003654 A1 | 1/2022 | Pariseau et al. |
| 2022/0042899 A1 | 2/2022 | Pariseau |

FOREIGN PATENT DOCUMENTS

| | | |
|---|---|---|
| EP | 2145171 B1 | 12/2018 |
| GB | 674265 A | 6/1952 |
| GB | 2233462 A | 1/1991 |
| GB | 2420616 A | 5/2006 |
| GB | 2474235 A | 4/2011 |
| JP | 56-39420 A | 4/1981 |
| JP | 3-296622 A | 12/1991 |
| JP | 2001-281128 A | 10/2001 |
| JP | 5005704 B2 | 8/2012 |
| WO | WO-1994/29716 A1 | 12/1994 |
| WO | WO-1998/56426 A1 | 12/1998 |
| WO | WO-1999/22219 A1 | 5/1999 |
| WO | WO-1999/56106 A1 | 11/1999 |
| WO | WO-2001/06333 A2 | 1/2001 |
| WO | WO-2001/63250 A1 | 8/2001 |
| WO | WO-2002/063294 A2 | 8/2002 |
| WO | WO-2004/010113 A1 | 1/2004 |
| WO | WO-2007/126681 A1 | 11/2007 |
| WO | WO-2008/140816 A1 | 11/2008 |
| WO | WO-2009/073649 A1 | 6/2009 |
| WO | WO-2009/073652 A1 | 6/2009 |
| WO | WO-2011/025763 A1 | 3/2011 |
| WO | WO-2012/055048 A1 | 5/2012 |
| WO | WO-2012/064878 A2 | 5/2012 |
| WO | WO-2013/017832 A1 | 2/2013 |
| WO | WO-2014/043413 A1 | 3/2014 |
| WO | WO-2016/065465 A1 | 5/2016 |
| WO | WO-2017/054098 A1 | 4/2017 |

OTHER PUBLICATIONS

Bauer et al., Monitoring personal fine particle exposure with a particle counter. J Expo Anal Environ Epidemiol. May-Jun. 1999;9(3):228-36.

Bell et al., Reassessment of the lethal London fog of 1952: novel indicators of acute and chronic consequences of acute exposure to air pollution. Environ Health Perspect. Jun. 2001;109(Suppl 3):389-94.

Chua et al., Electrical Mobility Separation of Airborne Particles Using Integrated Microfabricated Corona ionizer and Separator Electrodes. Journal of Microelectromechanical Systems. Feb. 2009;18(1):4-13.

Chung et al., Comparison of real-time instruments used to monitor airborne particulate matter. J Air Waste Manag Assoc. Jan. 2001;51(1):109-20.

Dylos Corporation, DC1100 Air Quality Monitor. User Manual. 19 pages, (2008).

Dylos Corporation, DC1100-Pro Air Quality Monitor, User Manual. 19 pages, (2008).

Dylos Corporation, DC1700 Air Quality Monitor, User Manual. 27 pages, (2010).

Erickson et al., Design of a Small, Battery-Operated Nanoparticle Sizer. NSTI-Nanotech. 2012;1:34-37.

Esmen et al., Theoretical Investigation of the Interrelationship Between Stationary and Personal Sampling in Exposure Estimation. Applied Occupational and Environmental Hygiene. Nov. 30, 2010;15(1):114-119.

Fluke, 985, Airborne Particle Counter, Users Manual, 32 pages, Mar. 2012.

Freescale Semiconductor, Inc., Data Sheet: Technical Data: High Temperature Accuracy Integrated Silicon Pressure Sensor for Measuring Absolute Pressure, On-Chip Signal Conditioned, Temperature Compensated and Calibrated. Document No. MP3H6115A, Rev 5.1, 13 pages, May 2012.

Freescale Semiconductor, Inc., Integrated Silicon Pressure Sensor On-Chip Conditioned Temperature Compensated and Calibrated. MPXV5004G, Rev 12, 22 pages, Sep. 2009.

Giorio et al., Field comparison of a personal cascade impactor sampler, an optical particle counter and CEN-EU standard methods for PM10, PM2.5 and PM1 measurement in urban environment. Journal of Aerosol Science. 2013;65:111-120.

Golczewski et al., Performance Modelling and Response of the Dual-wavelength Optical Particle Spectrometer (DWOPS). Abstracts of the European Aerosol Conference. 2004, pp. S839-S840.

Hach, MET ONE 7000: 7005, 7015, Doc026.53.80360, Edition 1. User Manual. 32 pages, Jul. 2013.

Hal Technology, HAL-HPC301, Handheld Particle Counter, Operational Manual. 33 pages, (2016).

(56) References Cited

OTHER PUBLICATIONS

Hal Technology, HAL-HPC600 Handheld Particle Counter, Operational Manual. 30 pages, (2008).
Hal Technology, Six-Channel Hybrid Handheld Particle Counter. 2 pages.
Howard-Reed et al., Use of a continuous nephelometer to measure personal exposure to particles during the U.S. Environmental Protection Agency Baltimore and Fresno Panel studies. J Air Waste Manag Assoc. Jul. 2000;50(7):1125-32.
Li et al., On the Feasibility of a Number Concentration Calibration Using a Wafer Surface Scanner. Aerosol Science and Technology. 2014;48:747-57.
Particles Plus, 8306 Handheld Airborne Particle Counter. Retrieved online at: https://www.emlab.com/m/store/Particles%20Plus%208306Handheld%20Particle%20Counter%20Spec%20Sheet.pdf. 2 pages, (2019).
Pope et al., Lung cancer, cardiopulmonary mortality, and long-term exposure to fine particulate air pollution. JAMA. Mar. 6, 2002;287(9):1132-41.
RTI International, MicroPEM™—PM2.5 Personal Exposure Monitor. www.rti.org, 2 pages.
SAS, Sentry Air Systems, Inc., Portable Particle Counter, Model #PPC-1. 1 page.
Schaap et al., Continuous Size-Separation of Airborne Particles in a Microchannel for Aerosol Monitoring. IEEE Sensors Journal. Nov. 2011;11(11):2790-7.
Schaap et al., Transport of airborne particles in straight and curved microchannels. Physics of Fluids. 2012;24(8):083301, 14 pages.
Sharp, GP2Y1010AU0F, Compact Optical Dust Sensor. Sharp Corporation. Data Sheet, 9 pages, Dec. 1, 2006.
Thermo Electron Corporation, Models: PDR-1000AN & PDR-1200S, Personal Dataram Particulate Monitoring, Instruction Manual. www.thermo.com/ih. 54 pages, Jan. 2004.
Thermo Scientific, MIE pDR-1500. Instruction Manual, Active Personal Particulate Monitor, Part No. 105983-00. Thermo Fisher Scientific, Inc. 112 pages, Jan. 31, 2014.
Thermo Scientific, Model pDR-AN/1200, personalDATARAM Instruction Manual. Particulate Monitor, Part No. 100181-00. Thermo Fisher Scientific, Inc. 56 pages, May 15, 2013.
TSI Incorporated, TSI Aerotrak Portable Particle Counter Model 9110, Application Note CC-107. Retrieved online at: https://www.tsi.com/getmedia/f7a6a0a2-cb7d-4c25-9674-b920b77d5835/AeroTrak_Portable_Particle_Counter_9110_A4_CC-107?ext =.pdf. 9 pages, (2013).
TSI, Aerosol Instrument Manager Software for Scanner Mobility Particle Sizer (SMPS) Spectrometer. User's Manual. P/N 1930038, Revision H. 119 pages, Apr. 2010.
TSI, AeroTrak Handheld Airborne Particle Counter, Model 9306, Operation Manual. P/N 6004215, Revision C. 81 pages, Feb. 2011.
TSI, AeroTrak Portable Airborne Particle Counter, Model 9110, Operation Manual, P/N 6004345, Revision A. 93 pages, Jul. 2010.
TSI, Model 3330 Optical Particle Sizer Spectrometer, Operation and Service Manual. P/N 6004403, Revision C. 114 pages, Jan. 2011.
TSI, Optical Particle Sizer, Model 3330, Specifications. 4 pages, (2010).
TSI, Sidepak™ Personal Aerosol Monitor, Model AM510, User Guide. TSI Incorporated, 74 pages, (2012).
Walton et al., Aerosol Instrumentation in Occupational Hygiene: An Historical Perspective. Aerosol Science and Technology. 1998;28(5):417-38.
Wikipedia, peer-to peer. Retrieved online at: https://web.archive.org/web/20161228184346/https://en.wikipedia.org/wiki/Peer-to-peer. 9 pages, Dec. 4, 2016.
European Search Report for Application No. 10812542.8, dated Jan. 28, 2014, 9 pages.
International Search Report and Written Opinion for Application No. PCT/US2010/046438, dated Oct. 19, 2010, 11 pages.
U.S. Appl. No. 14/214,899, filed Mar. 15, 2014, U.S. Pat. No. 10,983,040, Issued.
U.S. Appl. No. 17/233,204, filed Apr. 16, 2021, 2022-0042899, Published.
U.S. Appl. No. 14/214,870, filed Mar. 15, 2014, U.S. Pat. No. 9,141,094, Issued.
U.S. Appl. No. 14/214,876, filed Mar. 15, 2014, U.S. Pat. No. 10,352,844, Issued.
U.S. Appl. No. 16/443,508, filed Jun. 17, 2019, U.S. Pat. No. 11,519,842, Issued.
U.S. Appl. No. 16/537,492, filed Aug. 9, 2019, U.S. Pat. No. 11,169,077, Issued.
U.S. Appl. No. 17/512,406, filed Oct. 27, 2021, U.S. Pat. No. 11,579,072, Issued.
U.S. Appl. No. 14/701,485, filed Apr. 30, 2015, U.S. Pat. No. 9,677,990, Issued.
U.S. Appl. No. 15/620,781, filed Jun. 12, 2017, U.S. Pat. No. 10,718,703, Issued.
U.S. Appl. No. 16/917,830, filed Jun. 12, 2020, 2021-0025807, Allowed.
U.S. Appl. No. 16/900,787, filed Jun. 12, 2020, 2021-0025806, Allowed.
U.S. Appl. No. 16/894,666, filed Jun. 5, 2020, 2021-0063299, Published.
U.S. Appl. No. 16/933,967, filed Jul. 20, 2020, 2021-0088437, Published.
U.S. Appl. No. 16/896,112, filed Jun. 8, 2020, 2021-0025805, Allowed.
U.S. Appl. No. 16/901,939, filed Jul. 15, 2020, 2020-0371015, Published.
U.S. Appl. No. 17/139,625, filed Dec. 31, 2020, 2022-0003654, Published.
U.S. Appl. No. 18/013,990, filed Dec. 30, 2022, Pending.

PERSONAL AIR QUALITY MONITORING SYSTEM

CROSS-REFERENCE TO RELATED APPLICATIONS

This application is a continuation of, and claims priority to, U.S. Utility patent application Ser. No. 17/512,406, filed on Oct. 27, 2021, which is a continuation of, and claims priority to, U.S. Utility patent application Ser. No. 16/537,492, filed on Aug. 9, 2019, which is a continuation of, and claims priority to, U.S. Utility patent application Ser. No. 16/443,508, filed on Jun. 17, 2019, which is a continuation of, and claims priority to, U.S. Utility patent application Ser. No. 14/214,876, now U.S. Pat. No. 10,352,844, filed on Mar. 15, 2014, which claimed priority to U.S. Provisional Application Ser. No. 61/786,642 filed on Mar. 15, 2013, U.S. Provisional Application Ser. No. 61/786,616 filed on Mar. 15, 2013, U.S. Provisional Application Ser. No. 61/786,651 filed on Mar. 15, 2013, U.S. Provisional Application Ser. No. 61/786,658 filed on Mar. 15, 2013, and U.S. Provisional Application Ser. No. 61/786,667 filed on Mar. 15, 2013, the contents of all of the above-referenced applications hereby incorporated in their entirety.

This application is related to and incorporates by reference U.S. Non-Provisional application Ser. No. 14/214,899, filed herewith on Mar. 15, 2014, titled PARTICLE COUNTER WITH INTEGRATED BOOTLOADER by inventor David Pariseau; U.S. Non-Provisional application Ser. No. 14/214,870, filed herewith on Mar. 15, 2014, titled PERSONAL AIR QUALITY MONITORING SYSTEM by inventors David Pariseau and Adam Giandomenico; U.S. Non-Provisional application Ser. No. 14/214,903, filed herewith on Mar. 15, 2014, titled MIXED-MODE PHOTO-AMPLIFIER FOR PARTICLE COUNTER by inventors David Pariseau and Ivan Horban; U.S. Non-Provisional application Ser. No. 14/214,889, filed herewith on Mar. 15, 2014, titled INTELLIGENT MODULES IN A PARTICLE COUNTER by inventor David Pariseau; U.S. Non-Provisional application Ser. No. 14/214,895, filed herewith on Mar. 15, 2014, titled PULSE SCOPE FOR PARTICLE COUNTER by inventor David Pariseau; and U.S. Non-Provisional application Ser. No. 14/214,907, filed herewith on Mar. 15, 2014, titled PULSE DISCRIMINATOR FOR PARTICLE COUNTER by inventors David Pariseau and Ivan Horban.

BACKGROUND

Particle counters have been used for decades in manufacturing or industrial applications to measure particulate quantities in air, gases or liquids. Typically such counters would also bin particulates by size. These size bins vary by application and often by instrument. A particle counter has at least one size channel and popular counters can have 6 or more channels. Typically these size channels discriminate pulses based on the pulse height of the incoming signal. The pulse height refers to the peak voltage of the signal. Sometimes there is also rudimentary discrimination of pulse width, often in hardware.

These systems provide a go/no-go qualification for an incoming pulse, typically they are implemented in hardware and provide a simple gate function such that pulses below a minimum duration are excluded from counting. The intent is to reject noise, typically at the most sensitive resolution where the signal-to-noise ratio is the poorest. However such particle counters are limited in their scope of particle size they can detect, are difficult to calibrate and don't have a means for detecting equipment failure. Therefore, what is needed is a system and method that allows detection of a wide range of particle sizes that is easy to calibrate and determine failures.

SUMMARY

In accordance with various aspects and teachings of the present invention, a system and method are provided that allow detection of a wide range of particle sizes. The foregoing is a summary and includes, by necessity, simplifications, generalizations and omissions of detail. Those skilled in the art will appreciate that the summary is illustrative only and is not intended to be in any way limiting.

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific various aspects, embodiments, methods and instrumentalities disclosed in the drawings.

DETAILED DESCRIPTION

Figure 1:
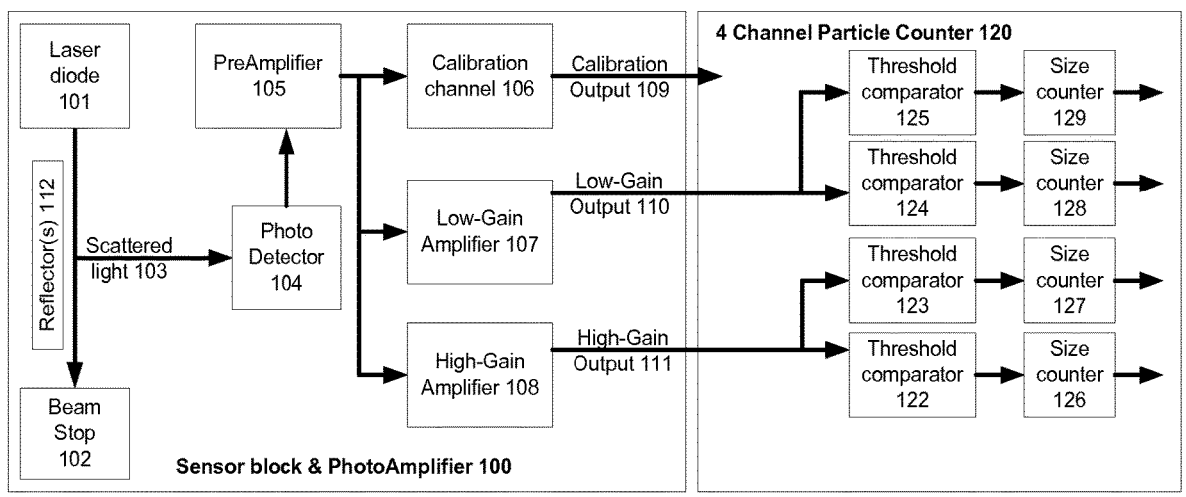
FIG. 1 shows a system in accordance with the various aspects of the present invention.

It is noted that, as used in this description, the singular forms "a," "an" and "the" include plural referents unless the context clearly dictates otherwise. Reference throughout this specification to "one aspect," "another aspect," "at least one aspect," "various aspects," "further aspect," "one embodiment," "an embodiment," "certain embodiments," or similar language means that a particular aspect, feature, structure, or characteristic described in connection with the embodiment or embodiments is included in at least one aspect or embodiment of the present invention. Thus, appearances of the phrases "in accordance with one aspect," "in accordance with various aspects," "in accordance another aspect," "one embodiment," "in at least one embodiment," "in an embodiment," "in certain embodiments," and similar language throughout this specification may, but do not necessarily, all refer to the same embodiment.

In accordance with the various aspects of the present invention, a device includes a computing device. As referred to herein, the devices may be part of a system or the system. It may be implemented to include a central processing unit (e.g., a processor), memory, input devices (e.g., keyboard and pointing devices), output devices (e.g., display devices), and storage device (e.g., disk drives). The memory and storage device are computer-readable media that may contain instructions or code that, when executed by the processor or the central processing unit, cause the device to perform certain tasks. In addition, data structures and message structures may be stored or transmitted via a data transmission medium, such as a signal on a communications link. Various communications channels may be used (e.g., the Internet, a local area network (LAN), a wide area network (WAN), or a point-to-point dial-up connection, or any other wireless channel or protocol) to create a link.

In accordance with the various aspects of the present invention, the device or system may be use various computing systems or devices including personal computers, server computers, hand-held or laptop devices, multiprocessor systems, microprocessor based systems, programmable consumer electronics, network personal computers (PCs), minicomputers, mainframe computers, distributed computing environments that include any of the above systems or devices, and the like. In accordance with the various aspects of the present invention, the device or system may also provide its services to various computing systems such as personal computers, cell phones, personal digital assistants, consumer electronics, home automation devices, and so on.

In accordance with the various aspects of the present invention, the device or system may be described in the general context of computer-executable instructions, such as program modules or code, which is executed by one or more computers or devices. Generally, program modules include routines, programs, objects, components, data structures, and so on that perform particular tasks or implement particular data types. Typically, the functionality of the program modules may be combined or distributed as desired in various embodiments.

Where a range of values is provided, it is understood that each intervening value, to the tenth of the unit of the lower limit unless the context clearly dictates otherwise, between the upper and lower limit of that range and any other stated or intervening value in that stated range, is encompassed within the aspects of the present invention. The upper and lower limits of these smaller ranges may independently be included in the smaller ranges and are also encompassed within the aspects of the present invention, subject to any specifically excluded limit in the stated range. Where the stated range includes one or both of the limits, ranges excluding either or both of those included limits are also included in the aspects of the present invention.

Referring now to FIG. 1, an example of a four-channel particle counter front-end 150 is shown below. In this example a beam present between the laser diode (101) and the beam stop (102) scatters light (103) as particles cross that beam. Typically the scattered light (103) is focused by one or more reflectors (112) onto the face of a photo-diode (104) on a photo-amplifier board (100). The tiny current in the photo-diode is then pre-amplified, usually by a trans-impedance amplifier (105). The pre-amplified signal is usually available on a calibration channel (106) for use during calibration. The pre-amplifier (105) signal is also sent to one or more amplifiers. In this case there are two, a low-gain channel (107) and a high-gain channel (108).

These amplifiers further increase the signal amplitude and transmit send it, often, to a separate particle counting board (120). On this board the incoming pulse signals are sorted into size bins. In this example there are four channels, two channels (122,123) connected to the high-gain amplifier (111) and two channels (124,125) connected to the low-gain amplifier (110). The threshold comparators (122,123,124, 125) are setup during the calibration phase so that they each channel counts pulses above some threshold. This can be a manual process with manual adjustment of a potentiometer, or a programmatic process where firmware would set a digital potentiometer or digital-to-analog converter. The counter outputs (126,127,128,129) would then be read by microcontroller and displayed to the user.

A similar system functions for gases other than air, and liquids. It also functions for counters that use a light-blocking rather than a light-scattering architecture, except that pulses in light-blocking systems see a decrease in light as the particles pass through the beam.

Traditionally, only a single sensor block and photo-amplifier board (100) is used in an instrument. This is largely due to the cost, and complexity of these sub-assemblies which often make-up the bulk of the cost of an instrument. It is also due to the processing requirements on the counter board.

With the advent of miniaturization, lower-cost components, increases in processing power the possibility of combining multiple particle sensor blocks into a single instrument becomes possible.

In certain embodiments, a counter includes multiple sensor block/photo-amplifier sub-assemblies within a single counter instrument. Each of these blocks would be communicatively coupled, e.g. connected, to a common counter board, or alternatively each of these blocks could have individual counter interface boards which might then provide processed data to a common instrument board which would manage the display, and external interfaces.

In certain embodiments, the airstream is split into multiple segments, each with a respective sensor block. Such an embodiment means that:
  the particle velocity is slowed for each sensor given a fixed sample volume, this means that the system gets more signal per particle and thus can develop a more sensitive instrument (on all channels);
  the system can use a count comparator to correlate counts between multiple sensors, which would allows for:
  failure notification, since one failed sensor will mean a loss of count uniformity,
  calibration notification, since count uniformity will degrade, and
  redundancy, ability for remaining sensors to estimate counts for a failed sensor; and
  the system can assign different sensors for different size ranges, and end-up with a sensor with a much larger dynamic range.

In certain embodiments, separate sensor blocks sample different airstreams. For example, instruments with multiple sensors can:
  check that filtration is working as expected. By sampling air from either side of the filter simultaneously, the system can check that particulate counts from two or more sensors reflect a functioning filter;
  check that manufacturing equipment is operating as expected. By sampling air from various areas around a particular piece of equipment, the system can ensure that particulate levels are what is expected. Doing so with a single instrument allows us to correlate these counts and make decisions that involve more than a single threshold; and
  allow for an upgrade path for manifold systems that currently share a sensor block and switch airstreams between samples, sharing a single block, which means that there is no continuous sampling of all channels. By replacing this with a counter multiple chambers, the manifold installation could be made continuous, at a lower cost than providing individual instruments for each channel.

Figure 2:
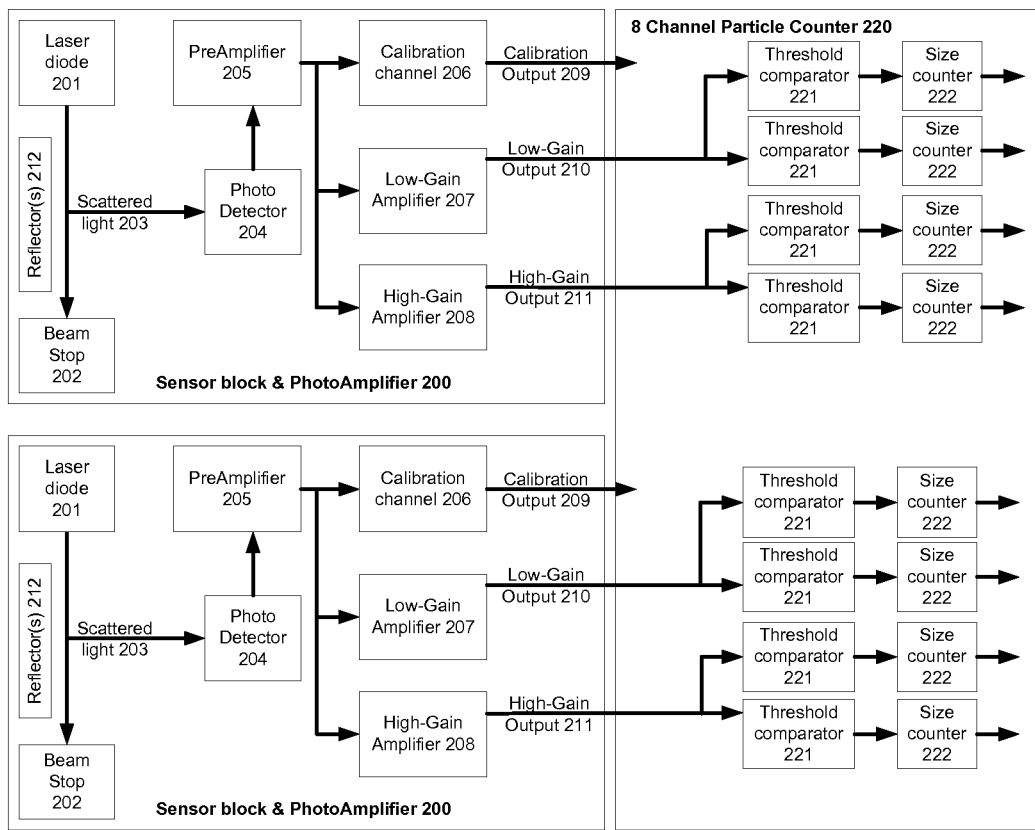
FIG. 2 shows a system in accordance with the various aspects of the present invention.

Referring now to FIG. 2, one such architecture, shown below as system 400, would provide two or more sensor blocks (200) having process the Gain Outputs (210,211), the two or more sensor blocks (200) being communicatively coupled to a common counter board (220) which would implement the threshold comparators (221) and counters (222).

Figure 3:
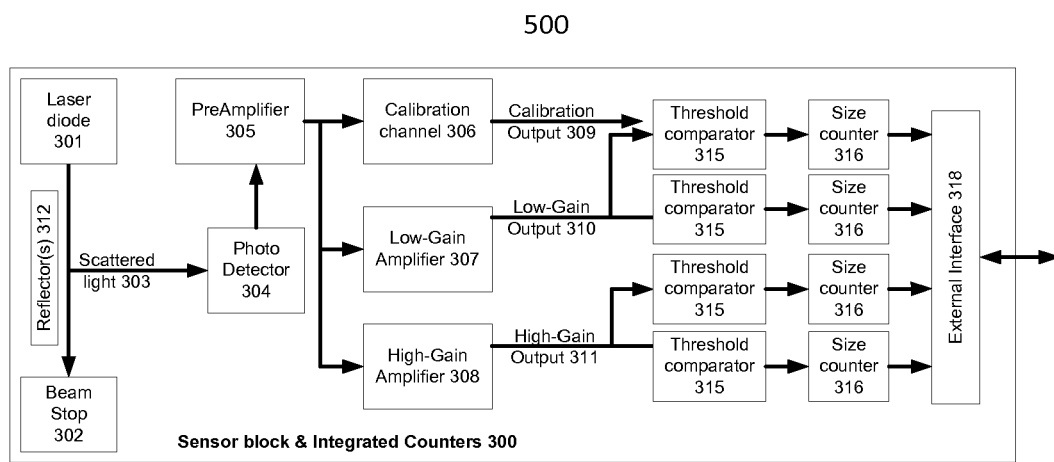
FIG. 3 shows a system in accordance with the various aspects of the present invention.

Referring now to FIG. 3, an alternative architecture is shown as system 500, based on the figure below, system 500 provides two or more of these sensor blocks combined with integrated counters (300). These Output Gain channels (307, 308) would interface to on-board Threshold comparators (315) and then to on-board Counters (316). These would be managed and accessed via an external interface (318). This interface could be any number of things, from a microcontroller with some type of standard interface like UART, SPI, I2C, UNIO, PMP, etc. to a custom interface like a memory mapped I/O interface for an off-board controller.

Regardless of the actual interface used, an off-board system would be used to setup and access the counter data for local processing, manipulation, display, etc. or to communicate this data to an external system.

Another option would be to have the sensor block have local processing beyond the typical Threshold Comparator and Counter implementation, such that pulse-height was measured for each pulse, and perhaps other parameters like pulse-width, time-of-arrival, etc. With such local processing it would allow the creation of intelligent sensors that could have a configurable number of channels, each with configurable thresholds.

And, going the other way, the sensors could simply consist of the sensor chamber, the light components, photo-detector and pre-amplifier with everything else being integrated into one or more printed circuit boards.

In certain embodiments, a single block could be created with multiple chambers in it, each with its own light source (or they could use a shared light source split from one laser and routed to each chamber) and then a single printed circuit board with all the electronics for the entire instrument.

In certain embodiments, more than one chamber is present in an instrument to provide enhanced or otherwise unavailable performance or functionality and that the information from these chambers is processed by one or more sub-systems within the instrument and/or forwarded to some external system for post-processing, analysis, reporting, etc.

With the increase of miniaturization of portable electronic products like heart-rate monitors, sophisticated pedometers, glucose monitors, insulin pumps, electro-encephalographs integrated with smart-phones, etc. People are increasingly carrying sophisticated instrumentation on or about their persons. Couple this with the increase of people with respiratory problems, and the growing proliferation of medicines, filtration equipment, masks, etc., there is a compelling case for creating a product that would alert the user to conditions that might aggravate respiration or bring-on asthma or other such attacks.

Figure 4:
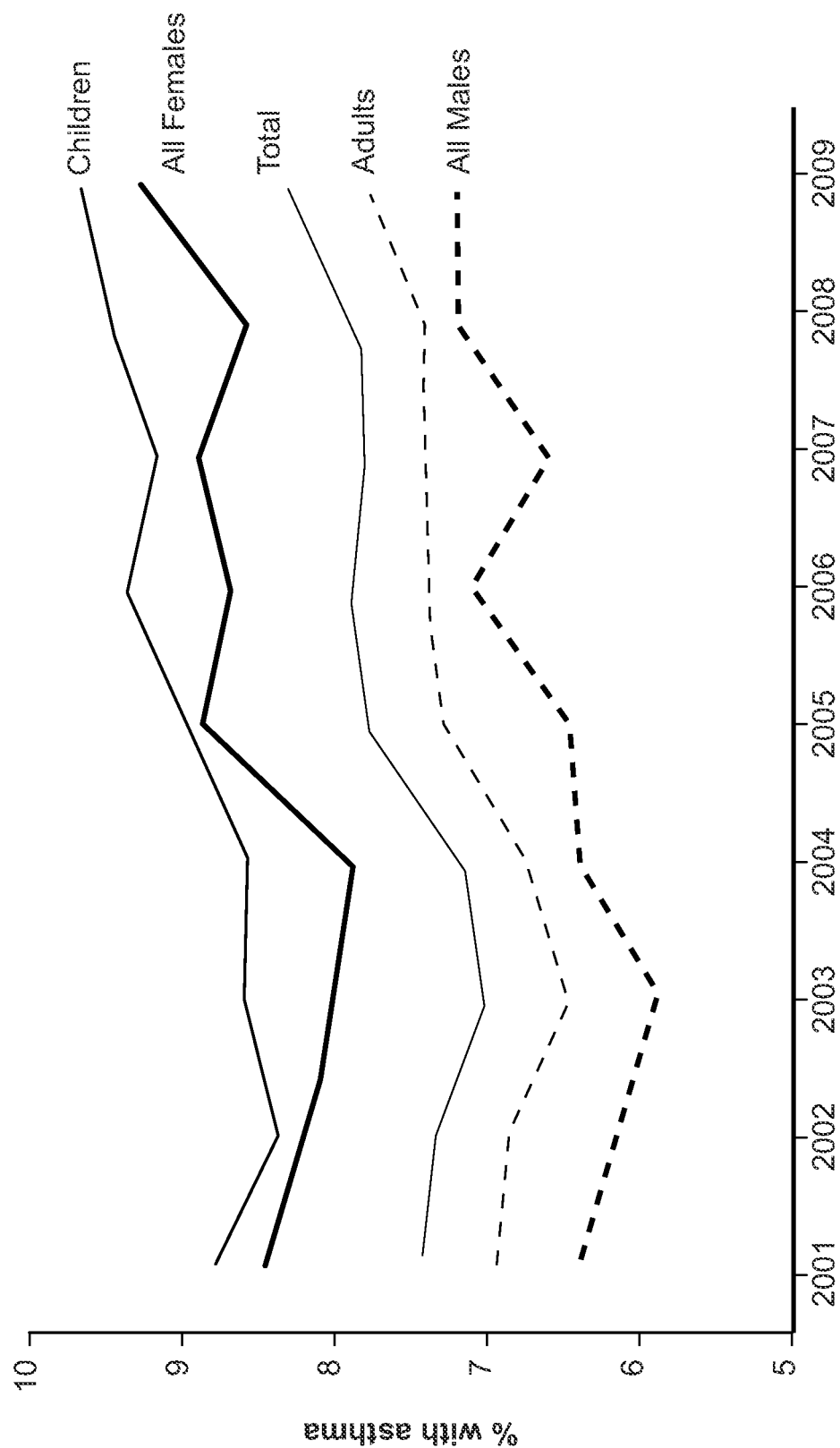
FIG. 4 shows a graph for figures from the Center for Disease Control (CDC) regarding the current state of asthma.

Referring now to FIG. 4, shown are recent figures from the Center for Disease Control (CDC) regarding the current state of asthma (a widespread respirator condition).

The number of people with asthma continues to grow. One in 12 people (about 25 million, or 8% of the population) had asthma in 2009, compared with 1 in 14 (about 20 million, or 7%) in 2001.

More than half (53%) of people with asthma had an asthma attack in 2008. More children (57%) than adults (51%) had an attack. 185 children and 3,262 adults died from asthma in 2007.

About 1 in 10 children (10%) had asthma and 1 in 12 adults (8%) had asthma in 2009. Women were more likely than men and boys more likely than girls to have asthma.

About 1 in 9 (11%) non-Hispanic blacks of all ages and about 1 in 6 (17%) of non-Hispanic black children had asthma in 2009, the highest rate among racial/ethnic groups.

The greatest rise in asthma rates was among black children (almost a 50% increase) from 2001 through 2009.

Therefore what is needed is a system and method that allows an individual to monitor particles that affect an individual.

In accordance with the various aspects and embodiments of the present invention, a system and method are disclosed that allow an individual to monitor particles that affect an individual.

Particles affect the performance of athletes and individuals that suffer from a medical condition. Particles affect everyone, since at some threshold an individual is susceptible. Thus, an early warning indication of particulates above some threshold would allow individuals to make informed decisions about changing their environment or circumstances and thereby perhaps avoid compromising their health or having to take medications to alleviate symptoms or conditions exacerbated by particulates. Particles may include pollutants as well as naturally occurring particles, such as like pollen etc., which pose health issues. It would be an advance in the art of particulate detection to provide data about particles in an individual's ambient environment to the individual.

A device that a user carried on or about his or her person, that monitored the local air quality and provided early warning of worsening air quality would allow the user to take measures to avoid being exposed to the environment and thereby avoid episodes of compromised or aggravated respiration, and perhaps also eliminate the need to take medications to alleviate such.

Particle counters are typically used in manufacturing or industrial applications to measure particulate quantities in air, gases or liquids. Typically such counters also bin particulates by size. These size bins vary by application and often by instrument. A particle counter has at least one size channel and popular counters can have 6 or more channels. Typically these size channels discriminate pulses based on the pulse height of the incoming signal. The pulse height referring to the peak voltage of the signal. Sometimes there is also rudimentary discrimination of pulse width, often in hardware.

In certain embodiments, an air quality monitoring system, such as a portable particle detection system, is worn or carried by a user to provide real-time monitoring of the air quality in their local environment.

Figure 5:
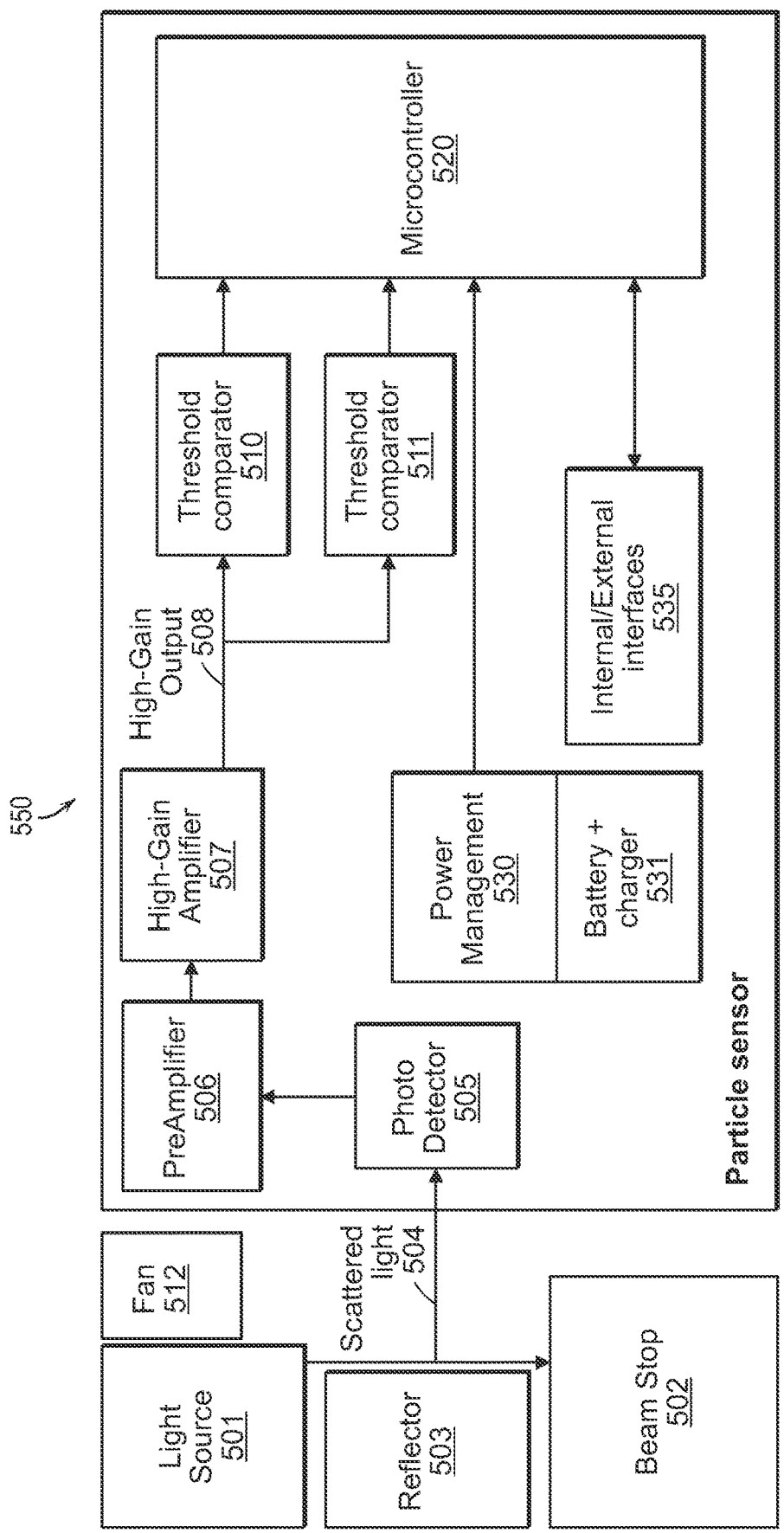
FIG. 5 shows a system in accordance with the various aspects of the present invention.

Referring now to FIG. 5, illustrated is an embodiment of an air quality monitoring system (550), also referred to as "personal particle counter" or "personal counter" or "personal counter device." Here, air is passed through a light beam generated by a light source (501) where particles scatter light (504). The airstream is generated by a fan or blower (512) or some other air impeller where air is drawn or pushed into the enclosure and is routed in such a way as to pass through the beam. In certain embodiments, the light source is a laser diode, a light-emitting-diode, or the equivalent. The light is focused by a lens to create a ribbon of light through which the airstream passes, in order to provide controlled scattering of light by particle size. In another implementation, a light blocking system is utilized, in which a beam is presented to a photo-diode and particles obscure the beam as they pass through it, thereby providing the signal.

In the case of a light-scattering system. Light scattered by particles in the stream (504) gets collected by a reflector (503) and presented to the photo-detector (505) and the resulting signal is amplified by the pre-amplifier stage (506), such as a trans-impedance amplifier. In some cases a second amplification (507) is utilized and the resulting electrical signal is used to drive one or more threshold comparators (510, 511). The outputs of the threshold comparators (510, 511) is used as inputs to counter channels within the microcontroller (520). These counts are used to determine the quality of the air. In this case there are two separate channels, which could be setup to different counts for particles of different sizes.

The air quality monitoring system (550) is powered locally by a battery (531), which is charged from some external power source. A large number of charging techniques are possible including, but not limited to: an external power connector, power from some external wired interface, wireless (inductive) charging, a solar cell, local charging from energy harvesting means. The battery power is managed locally via the Power Management circuit (530) that provided regulated power to the on-board circuitry (including the analog circuits (amplifiers, comparators, etc.)) and the digital circuitry (microcontroller, internal/external interfaces).

Here, the Internal/External user interfaces (535) is communicatively coupled to the threshold comparator. In certain embodiments, the Internal/External user interfaces (635) comprise one or more of these non-limiting features:
- an on-board display, liquid-crystal-display (LCD) or other, to display current air quality status, air-quality over time, cumulative particulate mass, graphs, charts, etc. or other air quality,
- an on-board memory (volatile or non-volatile) to store or log historic air quality data (for display use or later retrieval and reporting or analysis),
- an on-board eccentric-rotating-mass (ERM) motor, to provide vibration to alert or interface with user,
- an on-board audio transducer, to provide sound to alert or interface with user,
- one or more push-buttons on-board, to interface with user,
- an on-board wired interface channel for communication with external devices,
- an on-board wired interface to allow the battery to be charged, and
- an on-board wireless communications interface channel for communication with external devices.

Figure 6:
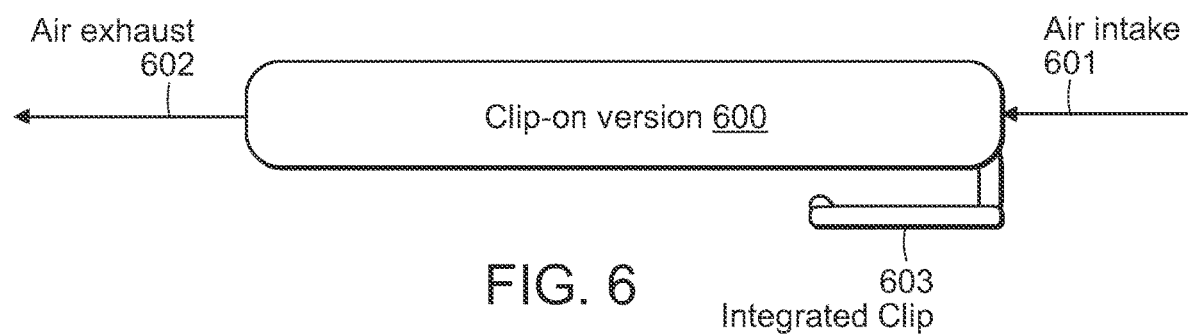
FIG. 6 shows a clip-on device incorporating a system in accordance with the various aspects of the present invention.

The above gives a general overview of the invention with some of the interface options. In certain embodiments, the air quality monitoring system (550) is embodied in a carrying means that takes on the structure of any of a plurality of form-factors, not limited by the examples provided below:

Referring to FIG. 6, a clip-on version (600) is shown. In this embodiment, the device has an integrated clip (603) which can be implemented a large number of ways: molded piece of deformable material, spring tensioned pivot, etc. In this example the air enters the unit on the right (601) and exits the device on the left (602). Though the example describes an integrated clip (where it is part of the enclosure), it could also just as easily be implemented with a clip mounted to an external holder that is used to capture and carry the device.

Figure 7:
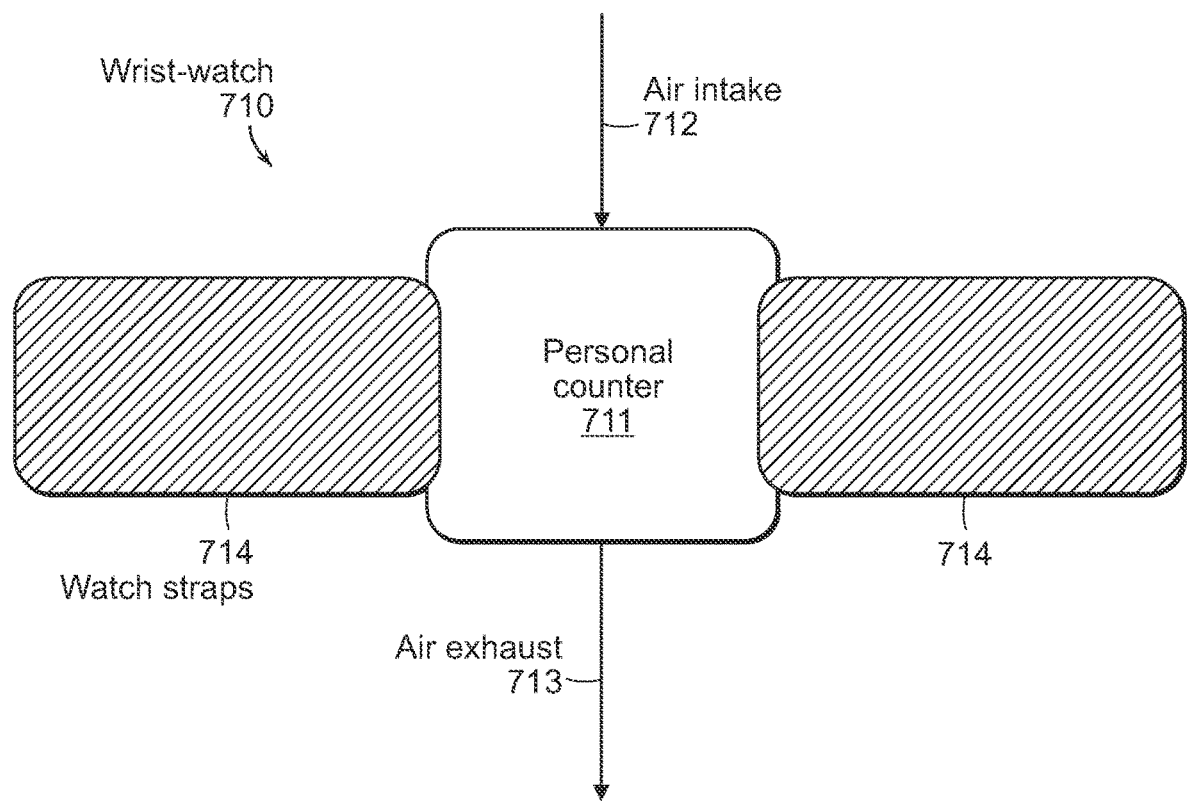
FIG. 7 shows a wrist watch incorporating a system in accordance with the various aspects of the present invention.

Referring now to FIG. 7, a wrist-watch or armband version (710) is shown. In this embodiment, the device is housed in a wristwatch type form factor with mounts to attach standard watch-bands (714). The air quality monitoring system (600), shown here as personal counter device (711), is configured to be worn on a wrist or arm of the person. In one embodiment, the personal counter device 711 takes the place a wristwatch, for example. Alternatively, the personal counter device 711 is integrated with a wristwatch to also provide time-keeping functionality. The air in this example enters from the top (712) and exits from the bottom (713).

Figure 8:
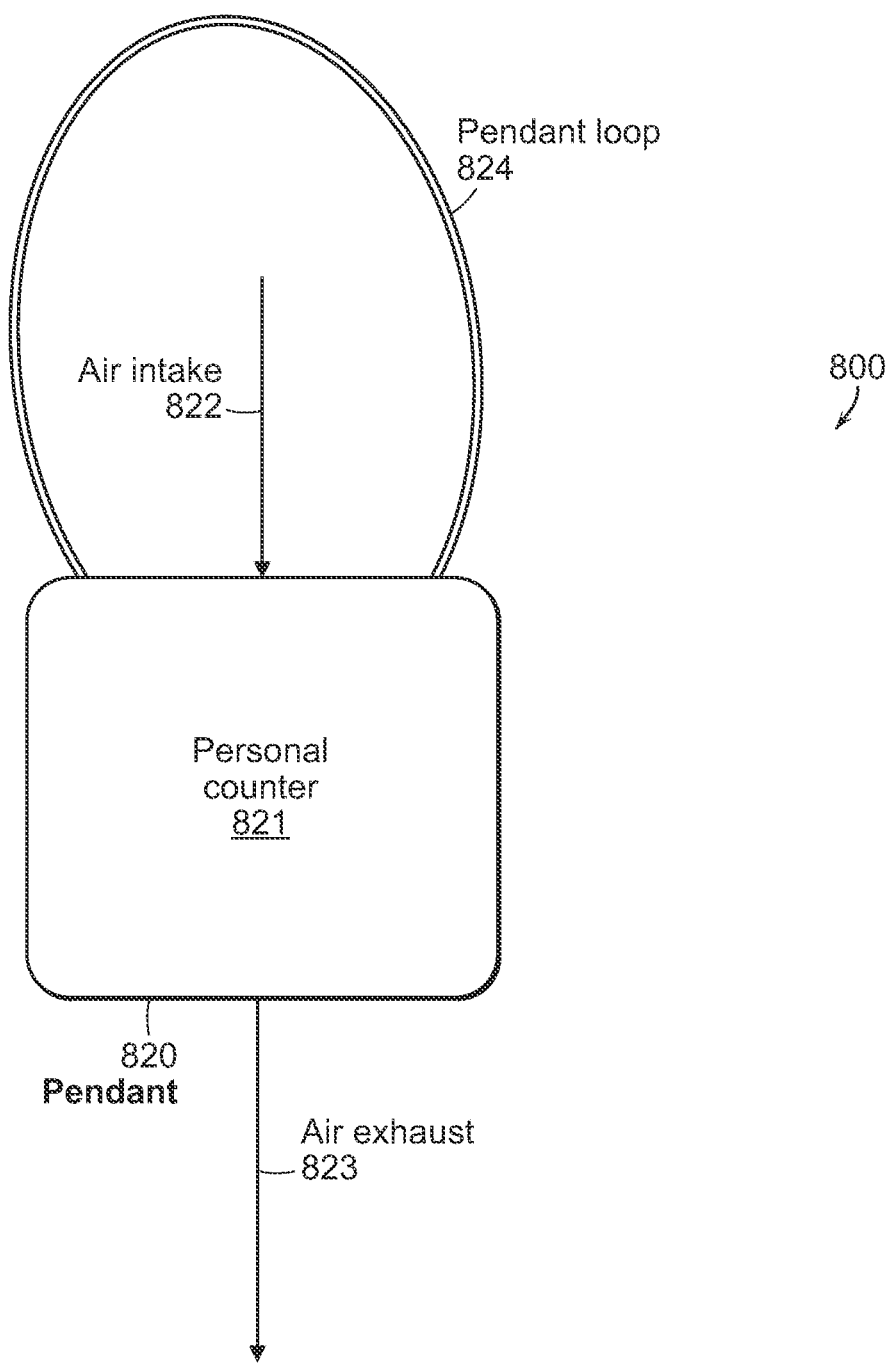
FIG. 8 shows a pendant incorporating a system in accordance with the various aspects of the present invention.

Referring now to FIG. 8, a pendant or necklace version (820) is shown. In this embodiment, the device is housed in a pendant form factor. The air quality monitoring system (800), shown here as the personal counter device (821), is hung from a pendant loop (824), which could be a chain, cord, string, or some other string-like material. In some implementations, the personal counter device (821) is also decorative as in a fashionable necklace or some such. In this example the air enters from the top (822) and exits from the bottom (823).

Figure 9:
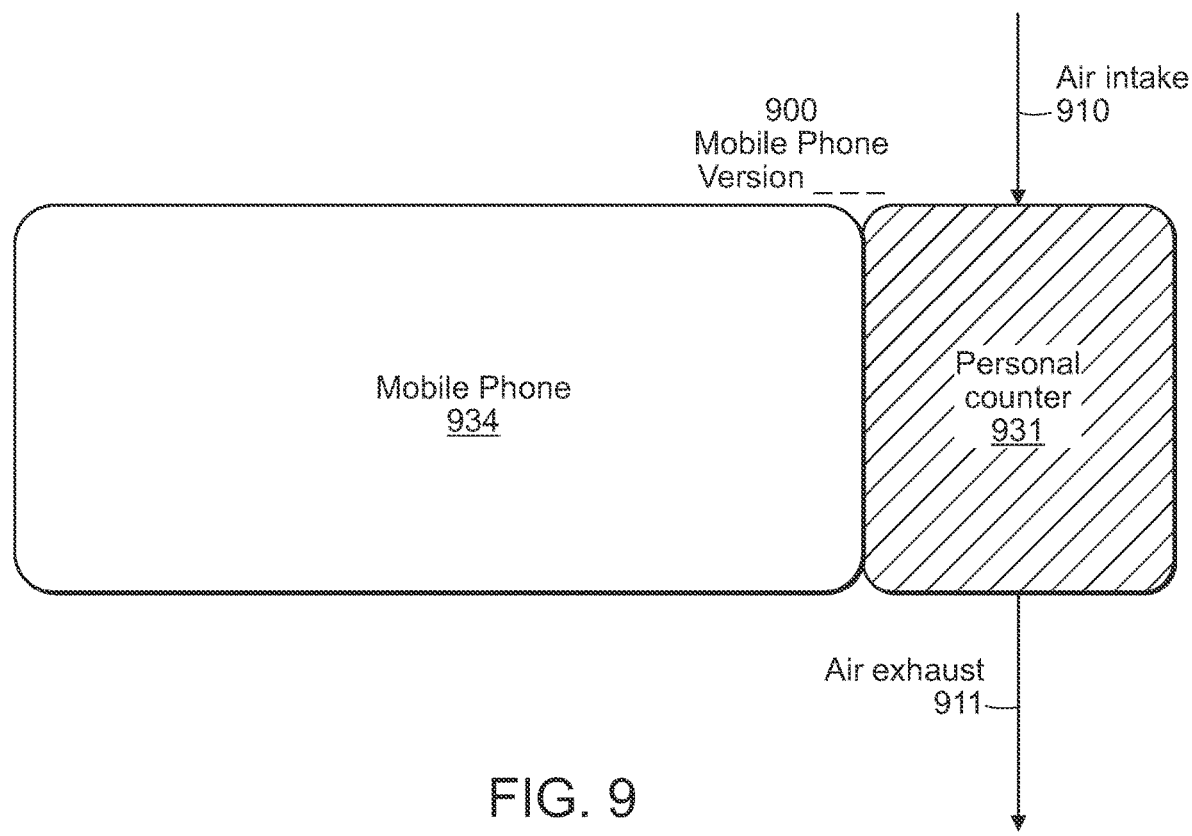
FIG. 9 shows a personal device incorporating a system in accordance with the various aspects of the present invention.

Referring now to FIG. 9, a personal device or Mobile-phone version (900) is shown. In this embodiment, the device is housed as an adjunct to or as a holder for a mobile or smart phone (902). In the example below, the personal counter device (904) is attached to the docking port of the Mobile Phone (902) in order to provide a wired interface. Alternatively or in combination, the personal counter 904 is molded into a holder for the phone and communicates with the phone wirelessly (via Bluetooth or WiFi for example). In this example the air enters from the top (910) and exits from the bottom (912).

In accordance with various aspects of the present invention, other possible embodiments include:
- a broach form-factor that could be pinned or clipped to a garment or purse or something similar,
- a carrier to allow it to be mounted in a vehicle,
- a carrier to allow it to be mounted to a bicycle or motorbike,
- a carrier for a golf-cart,
- an armband that can be worn, perhaps during sporting activities or training, and in a pair of glasses, perhaps with a heads-up display projected on one or more lenses.

Again many embodiments are possible for such a personal device, and the above embodiments are meant only to provide a sense of this variety rather than to attempt to describe the entire scope of possible embodiments.

While various embodiments have been described above, it should be understood that they have been presented by way of example only, not limitation, and various changes in form and details may be made. Any portion of the device, instrument, apparatus and/or methods described herein may be combined in any combination, except mutually exclusive combinations. The aspects and embodiments described herein can include various combinations and/or sub-combinations of the functions, components and/or features of the different embodiments described. For example, multiple, distributed processing systems can be configured to operate in parallel.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

It will be apparent that various aspects of the present invention as related to certain embodiments may be implemented in software, hardware, application logic, or a combination of software, hardware, and application logic. The software, application logic and/or hardware may reside on a server, an electronic device, or be a service. If desired, part of the software, application logic and/or hardware may reside on an electronic device and part of the software, application logic and/or hardware may reside on a remote location, such as server.

In accordance with the aspects disclosed in the teachings of the present invention and certain embodiments, a program or code may be noted as running on a device, an instrument, a system, or a computing device, all of which are an article of manufacture. Additional examples of an article of manufacture include: a server, a mainframe computer, a mobile telephone, a multimedia-enabled smartphone, a tablet computer, a personal digital assistant, a personal computer, a laptop, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform tasks and methods. Furthermore, an article of manufacture (e.g., device) includes a non-transitory computer readable medium having a series of instructions, such as computer readable program steps or code, which is encoded therein. In certain aspects and embodiments, the non-transitory computer readable medium includes one or more data repositories, memory, and storage, including non-volatile memory. The non-transitory computer readable medium includes corresponding computer readable program or code and may include one or more data repositories. Processors access the computer readable program code encoded on the corresponding non-transitory computer readable mediums and execute one or more corresponding instructions. Other hardware and software components and structures are also contemplated.

Unless defined otherwise, all technical and scientific terms used herein have the same meaning as commonly understood by one of ordinary skill in the art to which this invention belongs. Although any methods and materials similar or equivalent to those described herein can also be used in the practice of the present invention, representative illustrative methods and materials are described herein.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

We claim:

1. A personal particle counter apparatus, comprising:
   battery in a device housing, the device housing having a form factor enabling the device housing to be worn during operation by a user wherein the battery is connectable to a battery charger;
   an air intake and outlet fluidly connected to a chamber in the device housing wherein an airstream passes through the chamber;
   a light source that emits a beam of light that passes through the airstream passing through the chamber;
   a light detector that detects light that passes through the airstream in the chamber, the light detector configured to detect airborne particles passing through the beam of light in the airstream traversing from the air intake to the outlet;
   an analog circuit connected to the light detector, the analog circuit including at least one low gain amplifier and at least one high gain amplifier that are each in communication with the light detector, the at least one low gain amplifier and the at least one high gain amplifier that are configured to amplify signals for different particle size channels that convert signals from the light detector into amplified electrical pulses;
   a microcontroller configured to count particles from the user's local environment that are detected passing through the chamber wherein the microcontroller processes the different particle size channels to generate particle count data for each particle size channel;
   an integrated display on the device housing configured to display real-time information related to the particle count data; and
   a power management circuit connected to the power source that regulates power to the light source, the light detector, the microcontroller and the display.

2. The personal particle counter apparatus of claim 1 wherein the integrated display is an LCD display.

3. The personal particle counter apparatus of claim 1 wherein the integrated display is configured to display a current air quality status of the user's local environment.

4. The personal particle counter apparatus of claim 1 wherein the integrated display is configured to display information related to air quality over time.

5. The personal particle counter apparatus of claim 1 wherein the integrated display is configured to display information related to a cumulative particulate mass.

6. The personal particle counter apparatus of claim 1 wherein information related to detected airborne particulates is displayed in the form of a graph or chart on the integrated display.

7. The personal particle counter apparatus of claim 1 wherein the integrated display is configured to display information related to historic air quality logged to a memory.

8. The personal particle counter apparatus of claim 1 wherein the integrated display is configured to display particle counts associated with the different particle size channels, the apparatus further comprising an alarm to alert the user to a detected particle count level above a threshold or a cumulative particulate mass.

9. The personal particle counter apparatus of claim 1 wherein the analog circuitry further comprises at least one threshold comparator for each particle size channel configured to process the amplified electrical pulses from the at least one low gain amplifier and the at least one high gain amplifier to produce at least one output for each particle size channel based on any pulse above a threshold pulse height for each particle size channel that is a peak voltage of the amplified electrical pulse.

10. The personal particle counter apparatus of claim 1 wherein the device housing has a clip to attach the apparatus to clothing of a user.

11. The personal particle counter apparatus of claim 1 wherein the light source comprises a light emitting diode.

12. The personal particle counter apparatus of claim 1 wherein the apparatus communicates with a mobile phone by wired or wireless interface.

13. The personal particle counter apparatus of claim 1 wherein the apparatus is configured to be worn on a wrist or arm of a user.

14. The device of claim 1 wherein the analog circuit comprises a first sensor block and a second sensor block, each sensor block comprising at least one low gain amplifier and at least one high gain amplifier.

15. A method of measuring a real time particle count exposure of a user comprising:
attaching a personal particle counter device housing to a user, the device housing enclosing a battery that is connectable to a battery charger, a light source, a light detector, a power management circuit, an analog circuit connected to the light detector that includes at least one amplifier in communication with the light detector, the at least one amplifier configured to convert signals from the light detector into amplified electrical pulses, and a microcontroller that is programmed to count particles from the user's local environment that are detected passing through the chamber wherein the microcontroller processes a plurality of different particle size channels to generate particle count data for each particle size channel;
actuating an airflow through the device housing from an air intake to an outlet with an air impeller, the airflow passing through a chamber wherein light from the light source passes through the airflow in the chamber such that the light detector detects particles passing through the chamber;
communicating to the user wearing the device housing a real time particle count level being measured by the personal particle counter device housing and experienced by the user.

16. The method of claim 15 wherein the communicating step comprises displaying particle count data to the user on a display positioned on the device housing.

17. The method of claim 15 wherein the communicating step comprises communicating with a mobile phone.

18. The method of claim 15 wherein the communicating step comprises actuating an alarm to alert the user to a detected particle count level above a threshold.

19. The method of claim 15 wherein the attaching step comprises attaching the personal particle counter device housing to clothing of the user with a clip or wherein the user wears the personal counter device housing on a user's wrist or arm.

20. The method of claim 15 wherein the actuating step comprises operating the impeller that is a fan or a blower in the device housing to move the airstream through the chamber in the device housing.

* * * * *